(12) United States Patent
Kawai et al.

(10) Patent No.: US 6,778,356 B2
(45) Date of Patent: Aug. 17, 2004

(54) THIN FILM MAGNETIC HEAD AND METHOD OF MANUFACTURING THE SAME

(75) Inventors: Kenichi Kawai, Kawasaki (JP); Mitsumasa Okada, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 225 days.

(21) Appl. No.: 10/050,217

(22) Filed: Jan. 16, 2002

(65) Prior Publication Data

US 2003/0076628 A1 Apr. 24, 2003

(30) Foreign Application Priority Data

Oct. 19, 2001 (JP) ........................................ 2001-321940

(51) Int. Cl.⁷ ............................................. G11B 5/147
(52) U.S. Cl. ....................................................... 360/126
(58) Field of Search ................................. 360/126, 119

(56) References Cited

U.S. PATENT DOCUMENTS 5,805,391 A * 9/1998 Chang et al. ............... 360/126

FOREIGN PATENT DOCUMENTS

JP 11-175932 7/1999

* cited by examiner

Primary Examiner—Robert S. Tupper
(74) Attorney, Agent, or Firm—Greer, Burns & Crain, Ltd.

(57) ABSTRACT

In the thin film magnetic head of the present invention, angle of an end face of a heaped layer with respect to a lower magnetic pole layer is made obtuse so as to prevent flux leakage at a rear part of the heaped layer and improve writing characteristics of the magnetic head. The thin film magnetic head comprises: a lower magnetic pole layer; a gap layer provided on the lower magnetic pole layer; a sub-magnetic pole layer provided on the gap layer; an upper magnetic pole layer connected to a rear part of the sub-magnetic pole layer; and a heaped layer made of an electrically insulating material and provided on the rear side of the gap layer and between the lower magnetic pole layer and the sub-magnetic pole layer, the heaped layer having a slope portion, which is extended toward the gap layer and whose height is gradually reduced toward the same.

3 Claims, 2 Drawing Sheets

THIN FILM MAGNETIC HEAD AND METHOD OF MANUFACTURING THE SAME

BACKGROUND OF THE INVENTION

The present invention relates to a thin film magnetic head and a method of manufacturing the thin film magnetic head, more precisely relates to a thin film magnetic head, in which a sub-magnetic pole layer is provided to a front end part of an upper magnetic pole layer, and a method of manufacturing the thin film magnetic head.

A partial sectional view of a writing section of a conventional thin film magnetic head is shown in FIG. 5. A symbol 10 stands for a lower magnetic pole layer; a symbol 12 stands for an electrically insulating layer; symbols 14a and 14b stand for coils; symbols 16a and 16b stand for electrically insulating layers; and a symbol 18 stands for an upper magnetic pole layer. A sub-magnetic pole layer 20 is faced to the lower magnetic pole layer 10 and connected to a front end part of the upper magnetic pole layer 18. The sub-magnetic pole layer 20 is extended forward from the front end part of the upper magnetic pole layer 18. A gap layer 22 is sandwiched between the sub-magnetic pole layer 20 and a front end part 10a of the lower magnetic pole layer 10.

A heaped layer 24 corresponds to a rear part of the sub-magnetic pole layer 20 and is formed between the sub-magnetic pole layer 20 and the lower magnetic pole layer 10. The heaped layer 24 is made of an electrically insulating material, e.g., $SiO_2$. The heaped layer 24 is thicker than the gap layer 22, so that a step section is formed at a mid part of the sub-magnetic pole layer 20. Since the heaped layer 24 is thicker than the gap layer 22, a magnetic field can be concentrated between a front end face of the sub-magnetic pole layer 20 and a front end face of the lower magnetic pole layer 10, so that the writing section of the magnetic head is capable of efficiently writing data. Note that, the insulating layer, which constitutes the gap layer 22, covers the heaped layer 24, but the "gap layer 22" means a layer defining a gap between a front end of the lower magnetic pole layer 10 and that of the sub-magnetic pole layer 20.

Since the heaped layer 24 is formed between the lower magnetic pole layer 10 and the sub-magnetic pole layer 20, the rear part of the sub-magnetic pole layer 20 is separated from the lower magnetic pole layer 10. With this structure, no magnetic flux leaks from the rear part of the sub-magnetic pole layer 20 to the lower magnetic pole layer 10. Conventionally, the heaped layer 24 is formed by the steps of: forming an electrically insulating layer on the lower magnetic pole layer 10; and removing a part of the insulating layer, in which the gap layer 22 will be formed, by dry etching. In the dry etching step, the heaped layer 24 reacts, so the lower magnetic pole layer 10 is not removed, and etching time can be easily controlled.

However, in the conventional thin film magnetic head, a front end of the heaped layer 24, which is provided on the lower magnetic pole layer 10, rises with angle of θ (Apex), e.g., about the right angle. Therefore, magnetic flux is apt to leak at the step-shaped portion of the sub-magnetic pole layer 20. The leakage of flux is caused by function of an edge of the step-shaped portion of the sub-magnetic pole layer 20. These days, very high recording density is required, but loss caused by the flux leakage is relatively great, so the flux leakage should be reduced so as to improve writing characteristics of the magnetic head.

Besides $SiO_2$, resist is used as an electrically insulating material of the heaped layer 24. In the case of using resist, cracks are formed in the end face of the heaped layer 24 close to the lower magnetic pole layer 10 by thermal contraction while heat-curing the resist.

SUMMARY OF THE INVENTION

The present invention has been invented so as to solve the above described problems.

An object of the present invention is to provide a thin film magnetic head, in which angle of an end face of a heaped layer on a gap layer side with respect to a surface of a lower magnetic pole layer is made obtuse so as to prevent flux leakage at a rear part of the heaped layer and improve writing characteristics of the magnetic head.

Another object of the present invention is to provide a reliable thin film magnetic head, in which no cracks are formed in the heaped layer.

Other object of the present invention is to provide a method of manufacturing the thin film magnetic head of the present invention.

To achieve the objects, the present invention has following structures. The thin film magnetic head comprises: a lower magnetic pole layer; a gap layer provided on the lower magnetic pole layer; a sub-magnetic pole layer provided on the gap layer; an upper magnetic pole layer connected to a rear part of the sub-magnetic pole layer; and a heaped layer made of an electrically insulating material and provided on the rear side of the gap layer and between the lower magnetic pole layer and the sub-magnetic pole layer, the heaped layer having a slope portion, which is extended toward the gap layer and whose height is gradually reduced toward the same. With this structure, the gradual slope portion is formed in an end face of the heaped layer, so that flux leakage at the rear part of the sub-magnetic pole layer can be prevented, so that the writing characteristics of the magnetic head can be effectively improved. In the thin film magnetic head, the heaped layer having prescribed thickness and the gap layer may be integrated.

In the thin film magnetic head, a relationship between length of the gap layer (L1) and length of the slope portion (L2) may be L2>L1.

The method of manufacturing a thin film magnetic head, which comprises a lower magnetic pole layer, a gap layer formed on the lower magnetic pole layer and an upper magnetic pole layer formed on the gap layer, comprises the steps of: forming an electrically insulating layer on the lower magnetic pole layer; covering a part of the insulating layer, which will be left as a heaped layer, with resist; diagonally irradiating ion-milling particles to the insulating layer; and forming the upper magnetic pole layer. With this method, the heaped layer can be easily formed by etching the insulating layer by ion milling. In the method a sub-magnetic pole layer may be formed on the gap layer after the ion-milling step.

In the method, an irradiating angle of the ion-milling particle may be adjusted so as to control a shape of a slope portion, which is extended from the heaped layer toward the gap layer and whose height is gradually reduced toward the same. Further, in the method, thickness of the resist may be adjusted so as to control the shape of the slope portion. With these methods, the shape of the slope portion can be easily controlled.

BRIEF DESCRIPTION OF THE DRAWINGS

Embodiments of the present invention will now be described by way of examples and with respect to the accompanying drawings, in which.

DETAILED DESCRIPTION OF THE PREFERRED EMBODIMENTS

Preferred embodiments of the present invention will now be described in detail with reference to the accompanying drawings.

Figure 1:
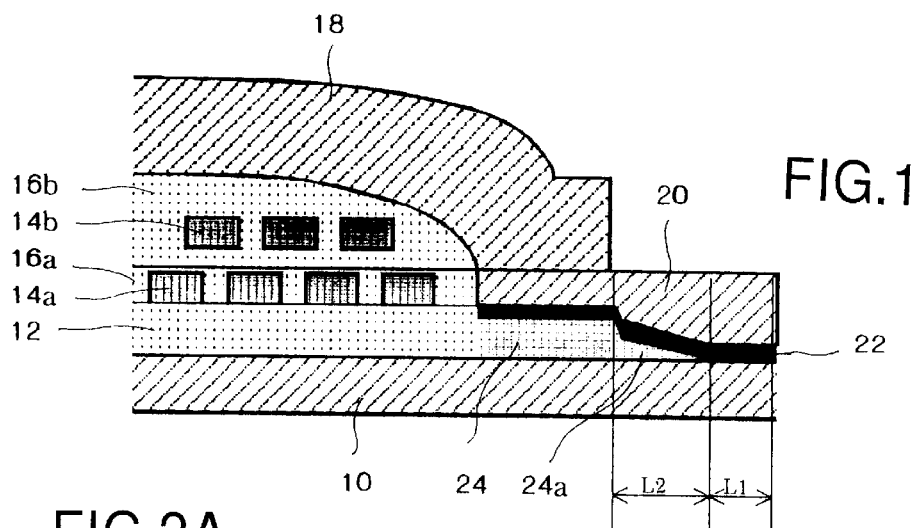
FIG. 1 is a partial sectional view of a writing section of a thin film magnetic head of an embodiment of the present invention.

FIG. 1 is a partial sectional view of a writing section of a thin film magnetic head of the present embodiment. The characteristic point of the present embodiment is a heaped layer 24 formed between a lower magnet pole layer 10 and a sub-magnetic pole layer 20.

Figure 5:
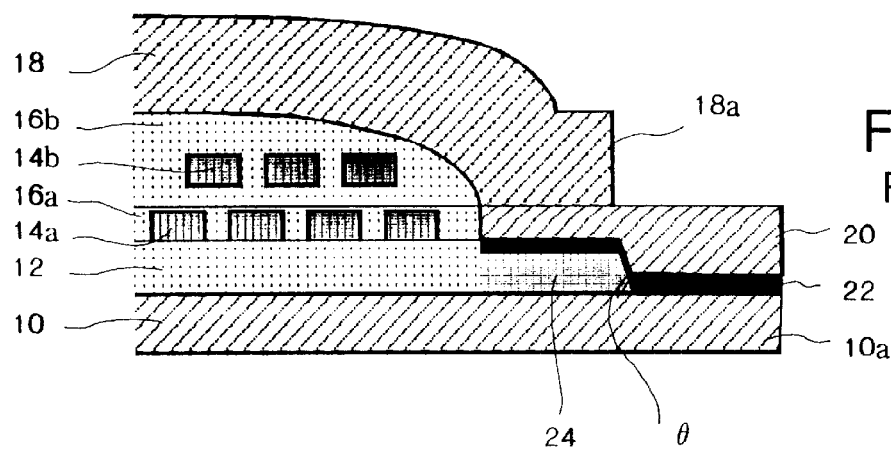
FIG. 5 is the partial sectional view of the conventional thin film magnetic head.

The thin film magnetic head of the present embodiment has the sub-magnetic pole layer 20, and its basic structure is similar to that of the conventional thin film magnetic head shown in FIG. 5. Namely, a gap layer 22 is formed on the lower magnetic pole layer 10, the sub-magnetic pole layer 20 is formed on the gap layer 22, and an upper magnetic pole layer 18 is connected to a rear part of the sub-magnetic pole layer 20.

Two layers of coils 14a and 14b are provided between the lower magnetic pole layer 10 and the upper magnetic pole layer 18 with an electrically insulating layer 12. By forming insulating layers 16a and 16b, the coils 14a and 14b are mutually electrically insulated, and the coil 14b and the upper magnetic pole layer 18 are also mutually insulated. Note that, two layers of the coils are provided in the present embodiment, one layer of the coil may be employed in the present embodiment.

The gap layer 22 is formed between the sub-magnetic pole layer 20 and a front end part of the lower magnetic pole layer 22. The heaped layer 24, which is a part of the insulating layer 12, corresponds to a rear part of the sub-magnetic pole layer 20. Unlike the conventional magnetic head in which the front end of the heaped layer 24 is vertically risen in a border between the heaped layer 24 and the gap layer 22 (see FIG. 5), the front end face of the heaped layer 24 of the present embodiment is formed into a slope face, whose height is gradually made lower toward the front end of the sub-magnetic pole layer 20.

In FIG. 1, a part "L2" is a slope portion 24a, which is the slope face of the heaped layer 24; a part "L1" acts as the gap layer 22. In the present embodiment, the length "L2" of the slope portion 24a is longer than the length "L1" of the gap layer 22 (L2>L1). By forming the gap layer 22, a gap of the writing section, which is formed between the lower magnetic pole layer 10 and the sub-magnetic pole layer 20, can be defined.

In the present embodiment, the sloped or slope portion 24a is provided on the rear part of the gap layer 22, so that the border between the heaped layer 24 and the gap layer 22, which was vertically formed like a step in the conventional magnetic head, can be made as a gentle slope. By the gentle slope portion, bad influences caused by an edge of the step-shaped border can be reduced, and flux leakage, which occurs between the lower magnetic pole layer 10 and the sub-magnetic pole layer 20 in the vicinity of the heaped layer 24, can be restricted.

FIGS. 2A–2E show the steps for manufacturing the thin film magnetic head of the present embodiment.

Figures 2A, 2B:
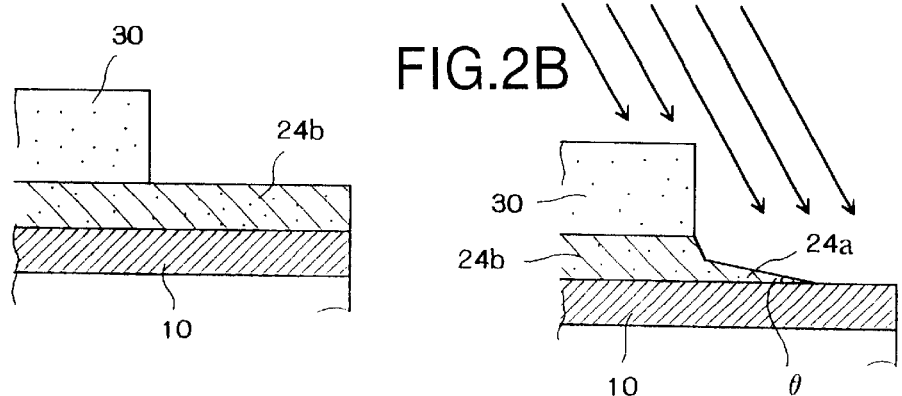
FIGS. 2A–2E are explanation views showing steps of a method of manufacturing the thin film magnetic head.

In FIG. 2A, the lower magnetic pole layer 10 is formed on a substrate, then an electrically insulating layer 24b, which will be the heaped layer 24, is formed on the lower magnetic pole layer 10, and a part to be left as the heaped layer 24 is covered with a resist layer 30. The lower magnetic pole layer 10 is a highly magnetizable layer, which is formed by forming a plate base on the substrate and electrolytic-plating the plate base with NiFe, etc. The insulating layer 24b, from which the heaped layer 24 is formed, is forming by spattering $SiO_2$ or $Al_2O_3$ with a prescribed thickness. The resist layer 30 for forming the heaped layer 24 is formed by coating a surface of the insulating layer 24b with photo resist and patterning the photo resist so as to leave the part of the insulating layer 24b as the heaped layer 24. The patterning step includes exposing and developing processes.

In FIG. 2B, the insulating layer 24b is etched by ion milling. In this step, ion-milling particles are diagonally irradiated toward the insulating layer 24b, so that the insulating layer 24b is partially shaded by the resist layer 30 from the particles. This is the characteristic point of the present embodiment. Since the ion-milling particles are linearly and diagonally irradiated, the etching in the vicinity of a base of the resist layer 30 can be braked; the etching far from the base of the resist layer 30 can be accelerated. With this diagonal etching, the part of the insulating layer 24b is diagonally etched, so that the slope portion 24a can be formed.

By irradiating ion-milling particles toward the insulating layer 24b, a reflected light having prescribed wave length can be observed. The wave length of the reflected light is changed when the insulated layer 24b is removed and the surface of the lower magnetic pole layer 10 is exposed. Therefore, proper timing of stopping the ion milling can be known by continuously observing the wave length of the reflected light.

By executing the ion milling for a predetermine time, the insulating layer 24b is removed from the front end part 10a of the lower magnetic pole layer 10 and the surface of the lower magnetic pole layer 10 is exposed. And, the slope portion 24a is formed from a position slightly shifted backward from the front end of the lower magnetic pole layer 10.

By controlling the irradiating direction of ion-milling particles, the etching direction can be controlled. Therefore, the shape of the slope portion 24a can be changed by changing the irradiating direction of ion-milling particles (irradiating angle). If the irradiating angle of ion-milling particles is wide (close to the right angle with respect to the surface of the insulating layer), a shaded area, which is shaded by the resist layer 30, is small, so that the length "L2" is made shorter and the Apex (angle θ) is made wide. On the other hand, if the irradiating angle is small, the length "L2" is made longer and the Apex (angle θ) is made small.

Even if the irradiating angle of ion-milling particles is fixed, the length "L2" and the Apex (angle θ) can be varied by changing thickness of the resist layer 30.

Figure 3:
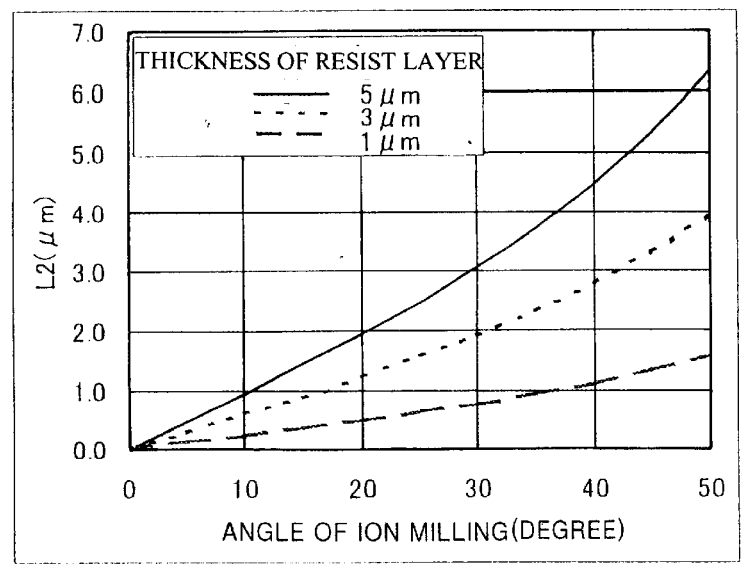
FIG. 3 is a graph showing a relationship between thickness of resist, angle of irradiating ion-milling particles and length of a slope portion.

FIG. 3 shows variation of the length "L2" of the slope portion 24a with respect to the irradiating angle and thickness of the resist layer. As shown in FIG. 3, the angle of the slope portion 24a (Apex) can be properly adjusted by adjusting the thickness of the resist layer 30 or the irradiating angle. Since the angle of the slope portion 24a (Apex) badly influences flux leakage, so the angle should be adjusted to reduce the flux leakage as less as possible.

Figures 2C, 2D:
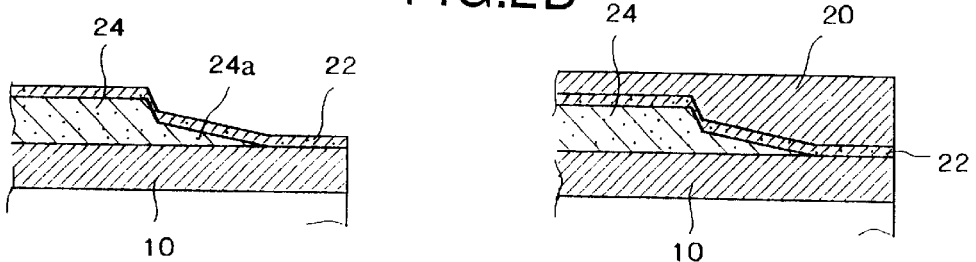

After the heaped layer 24 and the slope portion 24a are formed, the resist layer 30 is removed, so that the gap layer 22 is formed on the surface of the lower magnetic pole layer 10 as shown in FIG. 2C. The gap layer 22 may be formed by spattering a non-magnetizable material, e.g., $SiO_2$. The non-magnetizable material, which forms the gap layer 22, covers the surface of the lower magnetic pole layer 10 and whole surfaces of the heaped layer 24 and the slope portion 24a.

Note that, the gap layer 22 may be formed by another manner, in which the insulating layer 24b is partially left on the surface of the lower magnetic pole layer 10 when the insulating layer 24b, which will become the heaped layer 24, is etched by ion milling. In this case, the ion milling is stopped when the thickness of the insulating layer 24b left on the surface of the lower magnetic pole layer 10 is made equal to that of the gap layer 22.

After the gap layer 22 is formed, the sub-magnetic pole layer 20 is formed. The sub-magnetic pole layer 20 is formed by forming a plate base on the surface of the gap layer 22 and electrolytic-plating the plate base with a highly-magnetizable material, e.g., NiFe, as well as the lower magnetic pole layer 10. Actually, the magnetizable layer is formed on the gap layer 22 and the heaped layer 24 by electrolytic plating, so the magnetizable layer is patterned by etching so as to form the sub-magnetic pole layer 20. In FIG. 2D, the sub-magnetic pole layer 20 having the prescribed pattern is formed.

Figure 2E:
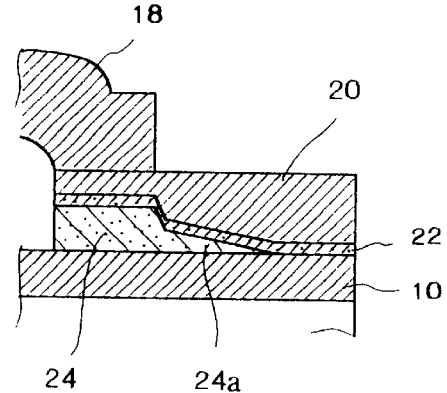

In FIG. 2E, the upper magnetic pole layer 18 is connected to an upper face of the sub-magnetic pole layer 20. The upper magnetic pole layer 18 is formed by forming the coils 14a and 14b and forming a magnetizable layer having a prescribed pattern on a surface of the insulating layer 16b.

By the above described steps, the slope portion 24a shown in FIG. 1 is formed in the border between the heaped layer 24 and the gap layer 22. Height of the slope portion 24a is gradually made lower from the heaped layer 24 to the gap layer 22.

Figure 4:
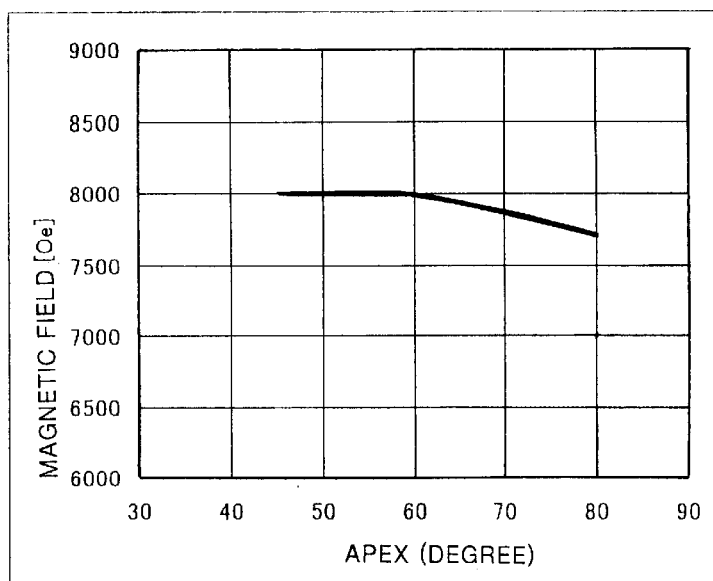
FIG. 4 is a graph showing a relationship between Apex and intensity of a magnetic field.

FIG. 4 is a graph showing a relationship between the Apex of the slope portion 24a of the heaped layer 24 and flux leakage between the lower magnetic pole layer 10 and the sub-magnetic pole layer 20. The graph in FIG. 4 shows variation of intensity of a magnetic field between the lower magnetic pole layer 10 and the sub-magnetic pole layer 20 with respect to the Apex. If the Apex is wider than 50°, the intensity of the magnetic field becomes lower. While the Apex is small, the flux leakage from the rear part of the sub-magnetic pole layer 20 to the lower magnetic pole layer 10 is restricted, so that the magnetic field efficiently works between the sub-magnetic pole layer 20 and an end face of the lower magnetic pole layer 10. Namely, characteristics of the writing section of the thin film magnetic head can be improved.

As shown in FIG. 4, the characteristics of the writing section can be improved by changing the shape of the heaped layer 24. Therefore, this method is highly effective for the thin film magnetic head to improve the characteristics of the writing section.

In the above described embodiment, the gap layer 22 is sandwiched between the lower magnetic pole layer 10 and the sub-magnetic pole layer 20, but the manner in which the heaped layer is formed by ion milling may be applied to a thin film magnetic head having no sub-magnetic pole layer, too. In this case, the gap layer 22 is sandwiched between the lower magnetic pole layer 10 and the upper magnetic pole layer 18.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims and therefore intended to be embraced therein.

What is claimed is:

1. A thin film magnetic head, comprising:
   a lower magnetic pole layer;
   a gap layer provided on the lower magnetic pole layer;
   a sub-magnetic pole layer provided on the gap layer;
   an upper magnetic pole layer connected to a rear part of the sub-magnetic pole layer; and
   a heaped layer made of an electrically insulating material and provided on the rear side of the gap layer and between the lower magnetic pole layer and the sub-magnetic pole layer, the heaped layer having a sloped portion, which is extended toward the gap layer and has a height relative to the lower magnetic pole layer that is reduced as the sloped portion extends toward the gap layer, the sloped portion having an apex angle that is 50° or less.

2. The thin film magnetic head according to claim 1, wherein the heaped layer has a prescribed thickness, and the heaped layer and the gap layer are integrated.

3. A thin film magnetic head, comprising:
   a lower magnetic pole layer;
   a gap layer provided on the lower magnetic pole layer;
   a sub-magnetic pole layer provided on the gap layer;
   an upper magnetic pole layer connected to a rear part of the sub-magnetic pole layer; and
   a heaped layer made of an electrically insulating material and provided on the rear side of the gap layer and between the lower magnetic pole layer and the sub-magnetic pole layer, the heaped layer having a sloped portion, which is extended toward the gap layer and whose height is reduced toward the gap layer,
   wherein a relationship between a length of the gap layer (L1) and a length of the slope portion (L2) is L2>L1.

* * * * *

UNITED STATES PATENT AND TRADEMARK OFFICE
CERTIFICATE OF CORRECTION

PATENT NO. : 6,778,356 B2  Page 1 of 1
DATED : August 17, 2004
INVENTOR(S) : Kawai et al.

It is certified that error appears in the above-identified patent and that said Letters Patent is hereby corrected as shown below:

<u>Column 6,</u>
Line 35, between "gap" and "and" delete "layer" and insert -- layer, --.

Signed and Sealed this

Nineteenth Day of October, 2004

JON W. DUDAS
*Director of the United States Patent and Trademark Office*